(12) United States Patent
Jansson et al.

(10) Patent No.: US 10,088,108 B2
(45) Date of Patent: Oct. 2, 2018

(54) METHOD OF FILLING A FUEL TANK WITH LIQUEFIED GAS AND LIQUEFIED GAS SYSTEM

(71) Applicant: WÄRTSILÄ FINLAND OY, Vaasa (FI)

(72) Inventors: Mathias Jansson, Vaasa (FI); Soren Karlsson, Solf (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 245 days.

(21) Appl. No.: 14/650,698

(22) PCT Filed: Dec. 14, 2012

(86) PCT No.: PCT/FI2012/051244
§ 371 (c)(1),
(2) Date: Jun. 9, 2015

(87) PCT Pub. No.: WO2014/091060
PCT Pub. Date: Jun. 19, 2014

(65) Prior Publication Data
US 2015/0330572 A1 Nov. 19, 2015

(51) Int. Cl.
*B65B 31/00* (2006.01)
*F17C 5/02* (2006.01)
(Continued)

(52) U.S. Cl.
CPC .............. *F17C 5/02* (2013.01); *B60K 15/013* (2013.01); *B60K 15/03006* (2013.01);
(Continued)

(58) Field of Classification Search
CPC ...... F17C 5/02; F17C 5/04; F17C 6/00; F17C 9/00; F17C 9/02; F17C 13/025;
(Continued)

(56) References Cited

U.S. PATENT DOCUMENTS 2,784,560 A * 3/1957 Johnson, Jr. .......... F17C 13/004
137/210
2,903,860 A * 9/1959 Brown ...................... F17C 9/00
114/74 A
(Continued)

FOREIGN PATENT DOCUMENTS

WO 2009063127 A1 5/2009
WO 2011053164 A1 5/2011

OTHER PUBLICATIONS

International Search Report for PCT/FI2012/051244 dated Jul. 4, 2013.

*Primary Examiner* — Paul R Durand
*Assistant Examiner* — Randall Gruby
(74) *Attorney, Agent, or Firm* — Heslin Rothenberg Farley Mesiti PC; Victor Cardona, Esq.

(57) ABSTRACT

A method for filling a fuel tank with liquefied gas includes liquefied gas being brought into the tank so that gas in introduced to a lower section of the tank below the surface of the liquefied gas in the tank, and during a first phase of the filling procedure while gas is introduced to a lower section of the tank the pressure of the tank is maintained below a predetermined set pressure by spraying of liquefied gas into a gas space in the upper section of the tank above the surface of the liquefied gas in the tank. At a predetermined state of the filling procedure a second phase of the procedure is initiated during which the spraying liquefied gas into a gas space in the upper section of the tank is decreased and the second phase is practiced until a predetermined filling stage of the tank is reached.

12 Claims, 2 Drawing Sheets

(51) Int. Cl.
*B60K 15/01* (2006.01)
*B60K 15/03* (2006.01)
*F17C 5/04* (2006.01)
*F17C 6/00* (2006.01)
*F17C 9/00* (2006.01)
*F17C 13/02* (2006.01)

(52) U.S. Cl.
CPC ............... *F17C 5/04* (2013.01); *F17C 6/00* (2013.01); *F17C 9/00* (2013.01); *F17C 13/025* (2013.01); *B60K 2015/03019* (2013.01); *B60K 2015/03309* (2013.01); *F17C 2205/0326* (2013.01); *F17C 2221/033* (2013.01); *F17C 2223/0161* (2013.01); *F17C 2223/033* (2013.01); *F17C 2223/046* (2013.01); *F17C 2225/0161* (2013.01); *F17C 2225/033* (2013.01); *F17C 2225/035* (2013.01); *F17C 2225/044* (2013.01); *F17C 2225/046* (2013.01); *F17C 2227/0107* (2013.01); *F17C 2227/0339* (2013.01); *F17C 2227/0372* (2013.01); *F17C 2250/032* (2013.01); *F17C 2250/043* (2013.01); *F17C 2250/0408* (2013.01); *F17C 2250/0491* (2013.01); *F17C 2250/0626* (2013.01); *F17C 2250/0636* (2013.01); *F17C 2260/025* (2013.01); *F17C 2265/065* (2013.01); *F17C 2265/066* (2013.01); *F17C 2270/0105* (2013.01)

(58) Field of Classification Search
CPC ............ F17C 2223/00; F17C 2250/00; F17C 2250/03; F17C 2250/032; F17C 2250/043; F17C 2250/0434; F17C 2250/0439; F17C 2250/0626; F17C 2250/0631; F17C 2265/065; B60K 15/013; B60K 15/03006; B60K 2015/03019; F02M 21/0218; F02M 21/0221; F02M 21/023; F02M 21/0239
See application file for complete search history.

(56) References Cited

U.S. PATENT DOCUMENTS

| | | | | |
|---|---|---|---|---|
| 3,109,293 A | * | 11/1963 | Williams | F04B 53/164 277/394 |
| 3,191,395 A | * | 6/1965 | Maher | F17C 13/025 62/47.1 |
| 3,246,479 A | * | 4/1966 | Kelley | F17C 13/10 165/45 |
| 3,733,838 A | * | 5/1973 | Delahunty | F25J 1/0025 62/48.2 |
| 3,800,550 A | * | 4/1974 | Delahunty | F25J 1/0025 62/116 |
| 3,877,240 A | * | 4/1975 | Kniel | B63J 2/14 62/240 |
| 3,946,572 A | * | 3/1976 | Bragg | F17C 5/02 141/82 |
| 4,106,581 A | * | 8/1978 | West | B60K 3/02 180/69.5 |
| 4,175,395 A | * | 11/1979 | Prost | F17C 9/02 62/50.2 |
| 4,680,937 A | * | 7/1987 | Young | F17C 13/123 137/210 |
| 4,924,822 A | * | 5/1990 | Asai | F02M 21/00 123/27 GE |
| 5,360,139 A | * | 11/1994 | Goode | F17C 5/007 141/18 |
| 5,373,701 A | * | 12/1994 | Siefering | F17C 9/02 62/48.1 |
| 5,373,702 A | * | 12/1994 | Kalet | F17C 9/00 123/525 |
| 5,411,374 A | * | 5/1995 | Gram | F04B 15/06 141/18 |
| 5,505,232 A | * | 4/1996 | Barclay | F17C 7/02 123/525 |
| 5,590,535 A | * | 1/1997 | Rhoades | F17C 9/02 62/50.2 |
| 5,687,776 A | * | 11/1997 | Forgash | F17C 5/007 141/11 |
| 5,699,839 A | * | 12/1997 | Dehne | F17C 6/00 141/18 |
| 5,787,940 A | * | 8/1998 | Bonn | F04B 19/06 141/18 |
| 5,954,101 A | * | 9/1999 | Drube | F16K 31/30 141/18 |
| 6,073,450 A | * | 6/2000 | Lak | B64G 1/402 62/47.1 |
| 6,125,637 A | * | 10/2000 | Bingham | F02B 43/00 62/48.2 |
| 6,440,317 B1 | * | 8/2002 | Koethe | B01D 17/0217 123/541 |
| 6,470,690 B1 | * | 10/2002 | Sicherman | F17C 9/02 62/48.1 |
| 6,901,973 B1 | * | 6/2005 | Hall | F17C 5/00 141/39 |
| 7,114,342 B2 | * | 10/2006 | Oldham | F17C 13/025 62/48.1 |
| 7,438,012 B2 | * | 10/2008 | Kackur | B63J 99/00 114/74 A |
| 7,581,405 B2 | * | 9/2009 | Higginbotham | F17C 1/00 62/47.1 |
| 7,606,778 B2 | * | 10/2009 | Dewar | G06Q 10/063112 705/321 |
| 7,861,748 B2 | * | 1/2011 | Iida | B60L 1/003 141/104 |
| 7,891,197 B2 | * | 2/2011 | Winter | F17C 5/02 62/50.1 |
| 8,656,726 B2 | * | 2/2014 | Pozivil | F17C 5/06 62/200 |
| 8,695,357 B2 | * | 4/2014 | Brook | F02M 21/06 62/49.1 |
| 9,151,248 B2 | * | 10/2015 | Lee | F02M 21/0245 |
| 9,163,785 B2 | * | 10/2015 | Mackey | F17C 13/02 |
| 9,267,645 B2 | * | 2/2016 | Mackey | F17C 5/007 |
| 9,317,567 B1 | * | 4/2016 | Lu | G06F 17/30539 |
| 9,494,281 B2 | * | 11/2016 | Chalk | F17C 5/02 |
| 9,683,517 B2 | * | 6/2017 | Kim | F02M 21/0215 |
| 9,683,702 B2 | * | 6/2017 | Chang | F17C 7/02 |
| 9,746,132 B2 | * | 8/2017 | Gustafson | F17C 7/04 |
| 2001/0042377 A1 | * | 11/2001 | Pozivil | F17C 13/004 62/48.3 |
| 2003/0054307 A1 | * | 3/2003 | Gerstendorfer | B63J 99/00 431/117 |
| 2004/0068993 A1 | * | 4/2004 | Irie | F17C 1/002 62/48.2 |
| 2005/0126220 A1 | * | 6/2005 | Ward | F17C 9/02 62/625 |
| 2006/0053806 A1 | * | 3/2006 | Tassel | B63B 25/16 62/48.1 |
| 2006/0086412 A1 | * | 4/2006 | Spittael | B63J 99/00 141/387 |
| 2006/0174965 A1 | * | 8/2006 | Hobbs | C01B 3/34 141/18 |
| 2007/0051114 A1 | * | 3/2007 | Mahlanen | B63J 99/00 62/50.1 |
| 2007/0068176 A1 | * | 3/2007 | Pozivil | F17C 3/025 62/45.1 |
| 2008/0134693 A1 | * | 6/2008 | Harper | F17C 1/12 62/50.7 |
| 2009/0239426 A1 | * | 9/2009 | Levander | B63B 25/12 440/88 F |
| 2009/0266086 A1 | * | 10/2009 | Lee | F17C 9/02 62/48.1 |
| 2010/0287955 A1 | * | 11/2010 | Watts | F02M 25/12 62/50.6 |

(56) References Cited

U.S. PATENT DOCUMENTS

| | | | |
|---|---|---|---|
| 2011/0179810 A1* | 7/2011 | Sipila | B63B 27/24 62/53.2 |
| 2011/0286913 A1* | 11/2011 | Lugtigheid | C01B 3/065 423/658.2 |
| 2011/0314839 A1* | 12/2011 | Brook | F02M 21/06 62/49.1 |
| 2012/0090527 A1* | 4/2012 | Backlund | B63B 27/24 114/74 R |
| 2012/0216919 A1* | 8/2012 | Nylund | B63B 25/12 141/311 R |
| 2013/0228151 A1* | 9/2013 | Dunn | F02M 21/0209 123/294 |
| 2013/0269633 A1* | 10/2013 | Bui | B63H 21/12 123/3 |
| 2013/0312871 A1* | 11/2013 | Hoffjann | F17C 5/06 141/69 |
| 2013/0319236 A1* | 12/2013 | Suominen | F01N 3/04 95/205 |
| 2015/0211914 A1* | 7/2015 | Dudar | G01F 23/246 73/292 |
| 2015/0315949 A1* | 11/2015 | Jansson | F17C 5/02 123/2 |
| 2015/0330572 A1* | 11/2015 | Jansson | F17C 5/02 141/4 |
| 2016/0059690 A1* | 3/2016 | Wildgrube | B60K 15/03006 180/69.5 |
| 2016/0281931 A1* | 9/2016 | Karlsson | F17C 9/04 |
| 2016/0281932 A1* | 9/2016 | Karlsson | F17C 9/04 |
| 2017/0030524 A1* | 2/2017 | Tilander | F17C 7/02 |
| 2017/0138536 A1* | 5/2017 | Bleomelen | F17C 3/025 |
| 2017/0183072 A1* | 6/2017 | D'Urso | B63H 21/38 |

\* cited by examiner

METHOD OF FILLING A FUEL TANK WITH LIQUEFIED GAS AND LIQUEFIED GAS SYSTEM

CROSS REFERENCE TO RELATED APPLICATIONS

This application is a national stage filing under section 371 of International Application No. PCT/FI2012/051244 filed on Dec. 14, 2012, and published in English on Jun. 19, 2014, as WO 2014/091060 A1, the entire disclosure of this application being hereby incorporated herein by reference.

TECHNICAL FIELD

The invention relates to filling a fuel tank with liquefied gas according to a preamble of claim 1.

The invention relates also to a liquefied gas fuel system.

BACKGROUND ART

Gas is becoming more and more attractive fuel for ships' and other marine vessels' prime movers and auxiliary engines. Particularly but not exclusively natural gas (NG) is feasible due to its availability. Natural gas is a gaseous mixture in the ambient circumstances consisting primarily of methane and small amounts of ethane, propane, butane and nitrogen. It has high hydrogen content relative to coal, so when combusted it provides inter alia low amount of emissions, very clean burning process and it is basically free of contaminants. Particularly in cruise vessels, ferries and so called ropax vessels, where passengers are on board, the absence of soot emissions and visible smoke in the exhaust gases of ship's engines is very important feature facilitated by using NG as fuel for the engines but also for vessels carrying goods and bulk materials. Usually natural gas is stored as liquefied natural gas (LNG) at temperature of about −162° C., thus the storage cause problems particularly when the LNG is stored at high pressure, about at 5 bar, which is typically the level that a gas operated piston engine requires.

When bunkering i.e. filling a fuel bunker of a LNG fuelled vessel the pressure inside the vessel's LNG tank is usually needs to be lowered to facilitate the flow of liquefied gas from a storage tank to the vessel's LNG tank in order to have a minimal/low enough counter pressure in the vessel's tank compared to the pressure in the storage tank i.e. LNG bunker tank. The lowering of the pressure may be accomplished by spraying cold LNG from the top of the tank which cools down the gas in the gaseous phase decreasing the pressure.

However, after bunkering the pressure must be again rebuilt in order to have a sufficient gas pressure for feeding the gas to the engines of the vessel at appropriate pressure. In the prior art systems the pressure is rebuilt by heating up the LNG and returning the gas at the top of the tank by means of a so called pressure build up circuit.

If the engines of the vessel are not running or are only idling there is only a limited heat available after bunkering. This means that the pressure build up takes a long time.

In WO2011053164A1 there is shown an LNG fuel tank system for at least one gas engine used for ship propulsion, comprising at least one LNG fuel tank and a gas vessel, the LNG fuel tank to be bunkered from an onshore LNG pressure tank filling facility by means of a LNG filling line, wherein the LNG fuel tank is a ship low pressure controlled atmospheric pressure LNG tank, and the gas vessel is a single shell non-insulated pressure vessel arranged to accumulate flashed and boil-off gas during LNG bunkering and pressure relieving the LNG fuel tank, respectively. The gas engines are fuelled from either the gas vessel or the LNG fuel tank, dependent on a predefined gas vessel pressure. Thus, the publication suggests accumulating flashed and boil-off gas during LNG bunkering while maintaining the pressure in the LNG fuel tank low by means of a compressor connected between the LNG fuel tank and the gas vessel. Fuelling the gas engine of the vessel is taken place so that gas from the gas vessel is used until the pressure approaches about 5-6 bar gauge, where after the fuelling is effected from the LNG fuel tank.

Although the fuel system shown in WO2011053164A1 may be advantageous as such, there has recently come out demands to provide other solutions to bunkering LNG fuel tank in a marine vessel particularly in a situation where the LNG tank(s) of the vessel is/are pressure vessel(s).

It is an object of the invention to provide method of filling a fuel tank with liquefied gas, and a liquefied gas system, which provides more simple operation and immediate utilization of the gas as fuel for a gas operated piston engine in a marine vessel.

DISCLOSURE OF THE INVENTION

Object of the invention are met substantially as is disclosed in independent claims. The other claims present more details of different embodiments of the invention.

According to the invention a fuel tank is filled by a filling procedure with a liquefied gas so that liquefied gas is brought into the tank so that gas in introduced to a lower section of the tank below the surface of the liquefied gas in the tank, and during a first phase of the filling procedure while gas in introduced to a lower section of the tank the pressure of the tank is maintained below a predetermined set pressure by spraying of liquefied gas into a gas space in the upper section of the tank above the surface of the liquefied gas in the tank. In the method at a predetermined state of the filling procedure a second phase of the procedure is initiated during which the spraying liquefied gas into a gas space in the upper section of the tank is decreased and the second phase is practised until a predetermined filling stage of the tank is reached.

According to an embodiment of the invention at the end of the second phase the gas pressure is at a level required by a gas utilizing engine connected to the tank.

According to an embodiment of the invention after a predetermined stage of the filling procedure the controlling of the spraying of liquefied gas into a gas space in the upper section of the tank is practised so that a second predetermined set pressure for the control is set which corresponds the required gas feed pressure of the engines in the vessel.

According to an embodiment of the invention a portion of the gas brought into the tank during the first phase of the filling procedure is sprayed into a gas space in the upper section of the tank above the surface of the liquefied gas in the tank.

According to an embodiment of the invention during the first phase the portion of the gas sprayed into a gas space in the upper section of the tank is set to be a constant portion of the gas introduced into the tank.

According to an embodiment of the invention during the first phase the rate of spraying of liquefied gas into a gas space in the upper section of the tank is controlled so that the actual gas pressure in the tank has decreasing tendency until the predetermined state of the filling procedure.

According to an embodiment of the invention during the filling process liquefied gas sprayed into a gas space in the upper section of the tank above the surface of the liquefied gas in the tank is recirculated from the lower section of the tank.

According to an embodiment of the invention the rate of spraying of liquefied gas into a gas space in the upper section of the tank above is controlled based on the difference between the actual gas pressure in the tank and the predetermined set pressure.

According to an embodiment of the invention during the second phase the rate of the spraying liquefied gas into a gas space in the upper section of the tank is totally stopped.

According to an embodiment of the invention in the method the predetermined state is defined so that the duration of the second phase is minimized.

Low counter pressure in the tank allows more rapid bunkering and tank's operating pressure is maintained immediately after bunkering with minimum need of pressure build up system.

According to a further embodiment of the invention liquefied gas fuel system for a gas operated engine, comprises a fuel tank which is in connection with at least one gas operated engine, a fuel line comprising an inlet connector into which an external source of liquefied gas may be temporarily connected, the feed line has at least two branches, the first one of which extends to the tank and has its outlet at vicinity of the bottom of the tank and the second branch extends to the tank having its outlet comprising a plurality of spray nozzles, and a control unit, wherein the control unit is arranged to exercise a method according to anyone of the claims 1-11.

BRIEF DESCRIPTION OF DRAWINGS

In the following the invention will be described with the reference to the accompanying schematic drawings, in which.

BEST MODE FOR CARRYING OUT THE INVENTION

Figure 1:
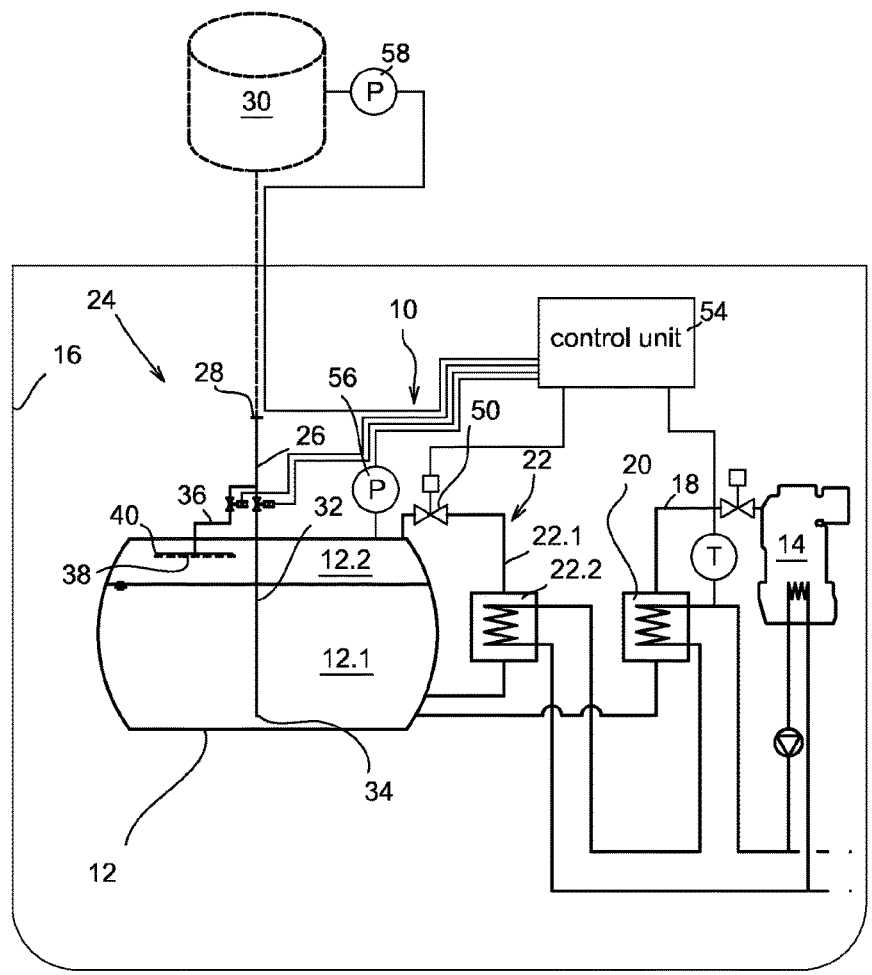
FIG. 1 illustrates an embodiment of the fuel feeding system according to the invention and FIG. 2 illustrates a graph of pressure during the filling procedure according to the invention.

FIG. 1 describes an embodiment of the fuel system 10 according to the invention. The fuel system comprises a fuel tank 12 which is in connection with at least one gas operated engine 14 of the vessel 16, so that the engine may be operated making use of the gas stored in the fuel tank. The gas, particularly liquefied natural gas, is stored in the tank 12 at considerably low temperature, typically at temperature of about −162° C. which is described as cryogenic conditions. Typically the gas fills the tank so that a part of the gas is as liquefied gas at the bottom of the tank 12.1 and part as gaseous gas at the upper part 12.2 i.e. gas space of the tank above the liquid portion of the gas. The tank 12 comprises insulation (not shown) to prevent excessive warming up of the LNG in the tank arrangement.

In this exemplary embodiment the tank is connected via a fuel conduit 18 with the engine 14. The fuel conduit is provided with an evaporator 20 by means of which liquefied gas may be evaporated prior to feeding to the engine according to the demand. This evaporator is called a main evaporator because during the operation of the engine the gas combusted in the engine is evaporated continuously from the liquefied gas in the tank 12. The tank 12 is also provided with a pressure build up system 22 by means of which the pressure in the tank 12 may be maintained at a level which makes it possible to deliver fuel to the engine at required feed pressure even without mechanical pumping. The pressure build up system 22 comprises a conduit 22.1 leading from the bottom section of the tank to the upper section of the tank 12 and an evaporator 22.2 arranged to the conduit. During the operation of the pressure build up system the liquefied gas is turning into gaseous form in the evaporator and is led to the upper part of the tank. The evaporation process increases the pressure in the tank. Pressure is detected by a sensor 56 which is in connection with a control unit 54. There is a valve 50 arranged to the conduit 22.1 by means of which the flow rate of the gas in the conduit may be controlled. The operation of the valve is controlled by the control unit 54 arranged to control the fuel system 10.

Since the engine consumes the gas the tank it must be filled occasionally with liquefied gas. In order to fill the tank, which is called also as bunkering, the tank 12 is provided with a filling system 24. The filling system comprises a feed line 26 with an inlet connector 28 into which an external source 30 of liquefied gas may be temporarily connected for bunkering. The feed line has at least two branches, the first one of which extends to the tank 12 and has its outlet 34 at vicinity of the bottom of the tank. Thus first branch 32 of the feed line opens below the surface of the liquefied gas in the tank 12. The second branch 36 extends to the tank 12 as well, but is has its outlet 38 at the vicinity of the top of the tank opening into the space of gaseous gas. The outlet 38 comprises a plurality of spray nozzles 40 which makes the liquid gas atomizing into small when it is introduced into the tank through the nozzles.

When the tank is filled the external source 30 of liquefied gas is connected to the connector 28 any preparatory actions are performed. The pressure in the tank 12 is lowered to a level being lower than the pressure in the source 30 so that liquefied gas may flow into the tank 12. The pressure in the external source may be measured by a sensor 58. During the filling of the tank the delivery of fuel from the tank 12 to the engine 14 is stopped and the engine may be stopped or operated making use of other possible fuel sources.

Now, fuel in liquid state is introduced to the lower section 12.1 of the tank through the first branch 32, below the surface of the liquefied gas in the tank. This causes the surface of the liquid gas to rise and the gas pressure in the upper section of the tank 12.2 tends to increase accordingly. Thus during the first phase of the filling procedure, while liquefied gas is introduced to the lower section 12.1 of the tank, the pressure in the tank is maintained below a predetermined set pressure by spraying of liquefied gas into a gas space 12.2 in the upper section of the tank above the surface of the liquefied gas in the tank by means of the second branch 36 of the fuel feed line 26. Spraying of the liquid gas lowers the temperature by evaporation of the sprayed gas which requires heat, and thus also lowers the pressure of the gas accordingly. The spraying operation is controlled by a control unit 54 arranged to control the fuel system 10.

According to the invention at a predetermined state of the filling procedure a second phase of the procedure is initiated during which the spraying liquefied gas into a gas space 12.2 in the upper section of the tank is decreased or stopped. This has an effect of causing the pressure increase in the tank.

The second phase of the filling procedure terminates to a predetermined filling state of the tank, such as being filled full. Advantageously, the second phase ends to the end of the whole filling procedure. Also, at the end of the second phase the gas pressure is at a level required by a gas utilizing engine connected to the tank.

The predetermined state of the filling procedure may be a predetermined filling level of the tank, a predetermined elapsed time of the filling or even an estimation of remaining time or remaining fuel amount to filling the tank full.

According to an embodiment of the invention after the predetermined stage of the filling procedure, spraying of liquefied gas into a gas space 12.2 in the upper section of the tank is practiced so that a second predetermined set pressure is reached or set, which corresponds to required gas feed pressure of the engine 14 in the vessel and the spraying rate of the gas is controlled by a control unit. The spraying into the gas space 12.2 comprises a desired portion of the total fuel flow into the tank. Advantageously the spraying is controlled by on/off manner operating a valve in the second branch 36. It is also possible to introduce all fuel through the nozzles 40

During the first phase of the filling procedure the pressure in the tank is controlled so that a portion of the gas brought into the tank is sprayed into a gas space in the upper section of the tank above the surface of the liquefied gas in the tank so that the pressure in the tank is maintained below the predetermined set pressure.

Even if not shown in the figure it is conceivable in certain cases the liquefied gas sprayed into a gas space in the upper section of the tank above the surface of the liquefied gas in the tank is recirculated from the lower section of the tank.

According to an embodiment, the portion of the gas sprayed into a gas space in the upper section of the tank is set to be a constant portion of the gas introduced into the tank. A valve in the second branch 36 is set to constant position during the second phase of the filling procedure. In this way, the control is simple and setting the position the valve suitably provides a high enough flow rate of the sprayed liquefied gas to maintain or even decrease the pressure while introducing liquefied gas to the lower section 12.1 of the tank 12.

When practising active control of the filling the rate of spraying of liquefied gas into a gas space in the upper section of the tank above is controlled so that the actual gas pressure in the tank has decreasing tendency until the predetermined state of the filling procedure.

According to an embodiment of the invention the rate of spraying of liquefied gas into a gas space in the upper section of the tank above is controlled based on the difference between the actual gas pressure in the tank and the predetermined set pressure.

Figure 2:
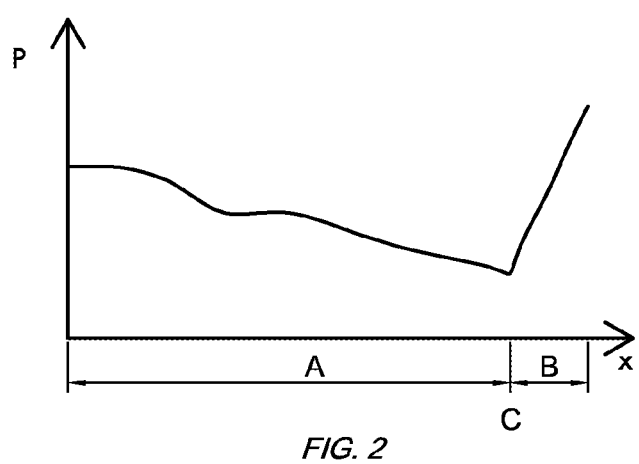

In FIG. 2 there is illustrated as a graph of pressure (vertical axis) in the tank as function of time or filling state of the tank (horizontal axis). During the first phase A of the filling procedure the pressure in the tank has decreasing tendency while the filling proceeds. Beginning at a predetermined state of the filling procedure C, the pressure is caused to rise considerably rapidly by decreasing or stopping the spraying liquefied gas into a gas space in the upper section of the tank. After the predetermined state C the second phase of the filling procedure B is practised during which the pressure is increased considerably until a predetermined filling stage of the tank is reached It is to be noted that only a few most advantageous embodiments of the invention have been described in the above. Thus, it is clear that the invention is not limited to the above-described embodiments, but may be applied in many ways within the scope of the appended claims. The features disclosed in connection with various embodiments can also be used in connection with other embodiments within the inventive scope and/or different assemblies can be combined from the disclosed features, should it be desired and should it be technically feasible.

The invention claimed is:

1. A method for filling a fuel tank with liquefied gas, the method comprising:
    filling the tank via a feed line with an inlet connector into which an external source of liquefied gas may be temporarily connected,
    introducing liquefied gas into a lower section of the tank below a surface of a liquefied gas in the tank via a first branch of the feed line, during a first phase of a filling procedure,
    maintaining a pressure of the tank below a predetermined set pressure during the first phase of the filling procedure by spraying of liquefied gas into a gas space in an upper section of the tank above the surface of the liquefied gas in the tank via a second branch of the feed line, while introducing liquefied gas into a lower section of the tank below a surface of the liquefied gas in the tank via the first branch of the feed line,
    the maintaining comprising controlling the spraying of the liquefied gas into the gas space in an upper section of the tank, measuring pressure in the tank by a sensor obtaining a pressure measurement in the tank, a controller coupled to the sensor comparing the pressure measurement to the set pressure, and
    initiating a second phase of the filling procedure to stop the spraying of the liquefied gas via the second branch of the feed line into the gas space in the upper section of the tank, and
    increasing the pressure in the tank during the second phase.

2. Method according to claim 1, wherein at an end of the second phase the gas pressure is at a level required by a gas utilizing engine connected to the tank.

3. Method according to claim 1, wherein after the predetermined state of the filling procedure is reached further comprising controlling the spraying of liquefied gas into the gas space in the upper section of the tank so that a second predetermined set pressure of the tank corresponds to a required gas feed pressure of an engine in a vessel.

4. A method for filling a fuel tank with liquefied gas, the method comprising:
    filling the tank via a feed line with an inlet connector into which an external source of liquefied gas may be temporarily connected,
    introducing of liquefied gas into a lower section of a tank below a surface of a liquefied gas in the tank via a first branch of the feed line, during a first phase of a filling procedure,
    maintaining a pressure of the tank below a predetermined set pressure during the first phase of the filling procedure by spraying liquefied gas into a gas space in an upper section of the tank above the surface of the liquefied gas in the tank via a second branch of the feed line and controlling the spraying of the liquefied gas into the gas space in an upper section of the tank by measuring pressure in the tank by a sensor obtaining a pressure measurement in the tank,
    initiating a second phase of the filling procedure to decrease the flow of the liquefied gas into the gas space in the upper section of the tank, and
    increasing the pressure in the tank during the second phase.

5. Method according to claim 4, wherein during the first phase a rate of spraying of liquefied gas into the gas space in the upper section of the tank is controlled so that the gas pressure in the tank is decreasing until the predetermined state of the filling procedure.

6. Method according to claim 4, wherein a rate of the spraying of liquefied gas into the gas space in the upper section of the tank is controlled based on the difference between the actual gas pressure in the tank and the predetermined set pressure.

7. Method according to claim 4, wherein during the second phase a rate of the spraying liquefied gas into the gas space in the upper section of the tank is totally stopped.

8. Method according to claim 4, wherein the liquefied gas spraying into the gas space is recirculated from the lower section of the tank.

9. The method of claim 4 wherein the decreasing the flow comprises stopping the flow.

10. A method for filling a fuel tank in a marine vessel with liquefied gas, the method comprising:
   filling the fuel tank via a feed line with an inlet connector into which an external source of liquefied gas is temporarily connected for bunkering the vessel,
   introducing a portion of the liquefied gas into a lower section of the tank below a surface of a liquefied gas in the tank via a first branch of the feed line,
   decreasing a pressure of the tank while introducing liquefied gas via the first branch of the feed line, by spraying a portion of the liquefied gas into a gas space in an upper section of the tank above the surface of the liquefied gas in the tank via a second branch of the feed line, and maintaining the pressure in the tank below the pressure in the external source,
   at a predetermined state of the filling procedure stopping the spraying of the liquefied gas via the second branch of the feed line into the gas space in the upper section of the tank, and
   increasing the pressure in the tank until the tank is filled, and wherein at the end of the filling the gas pressure is at a level required by a gas utilizing engine connected to the fuel tank.

11. The method according to claim 10, wherein the pressure of the tank is decreased by spraying a constant rate of the liquefied gas into a gas space in an upper section of the tank above the surface of the liquefied gas in the tank via the second branch of the feed line.

12. Liquefied gas fuel system for a gas operated engine, comprising:
   a fuel tank which is in connection with at least one gas operated engine,
   a fuel line comprising an inlet connector into which an external source of liquefied gas may be temporarily connected,
   the fuel line has at least two branches, the first one of which extends to the tank and has its outlet at vicinity of the bottom of the tank and the second branch extends to the tank having its outlet comprising a plurality of spray nozzles,
   a control unit arranged to exercise a method according to claim 1.

* * * * *